(12) United States Patent
Malik et al.

(10) Patent No.: US 6,448,744 B1
(45) Date of Patent: Sep. 10, 2002

(54) POWER FACTOR CORRECTION CIRCUIT

(75) Inventors: Randhir S. Malik, Cary; William Hemena, Raleigh, both of NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/702,221

(22) Filed: Oct. 30, 2000

(51) Int. Cl.[7] ................................................. G05F 1/70
(52) U.S. Cl. .......................................... 323/207; 363/89
(58) Field of Search ............................... 363/20, 21.01, 363/81, 89; 323/207

(56) References Cited

U.S. PATENT DOCUMENTS

| | | |
|---|---|---|
| 5,233,509 A | 8/1993 | Ghotbi |
| 5,640,310 A | 6/1997 | Yasumura |
| 5,644,214 A * | 7/1997 | Lee ............................. 323/211 |
| 5,818,707 A * | 10/1998 | Seong et al. .................. 363/89 |
| 5,847,942 A | 12/1998 | Bazinet et al. |
| 5,949,229 A * | 9/1999 | Choi et al. .................. 323/320 |
| 5,969,962 A | 10/1999 | Gabor |
| 5,973,946 A | 10/1999 | Yasumura |
| 6,178,104 B1 * | 1/2001 | Choi ............................ 363/89 |

* cited by examiner

*Primary Examiner*—Adolf Deneke Berhane
(74) *Attorney, Agent, or Firm*—Sawyer Law Group LLP

(57) ABSTRACT

A single stage power factor correction circuit is disclosed. The circuit comprises a first comparator for receiving an output voltage and a reference voltage and for providing a control voltage, a multiplier coupled to the first comparator for receiving the control voltage and an input voltage and then providing a sine wave voltage and a control portion coupled to the multiplier for controlling the sine wave voltage and providing a regulated DC output. Through the use of the circuit in accordance with the present invention, circuit efficiency is increased and the number of circuitry components is reduced. By reducing the number of circuitry components a significant reduction in manufacturing costs is achieved.

7 Claims, 3 Drawing Sheets

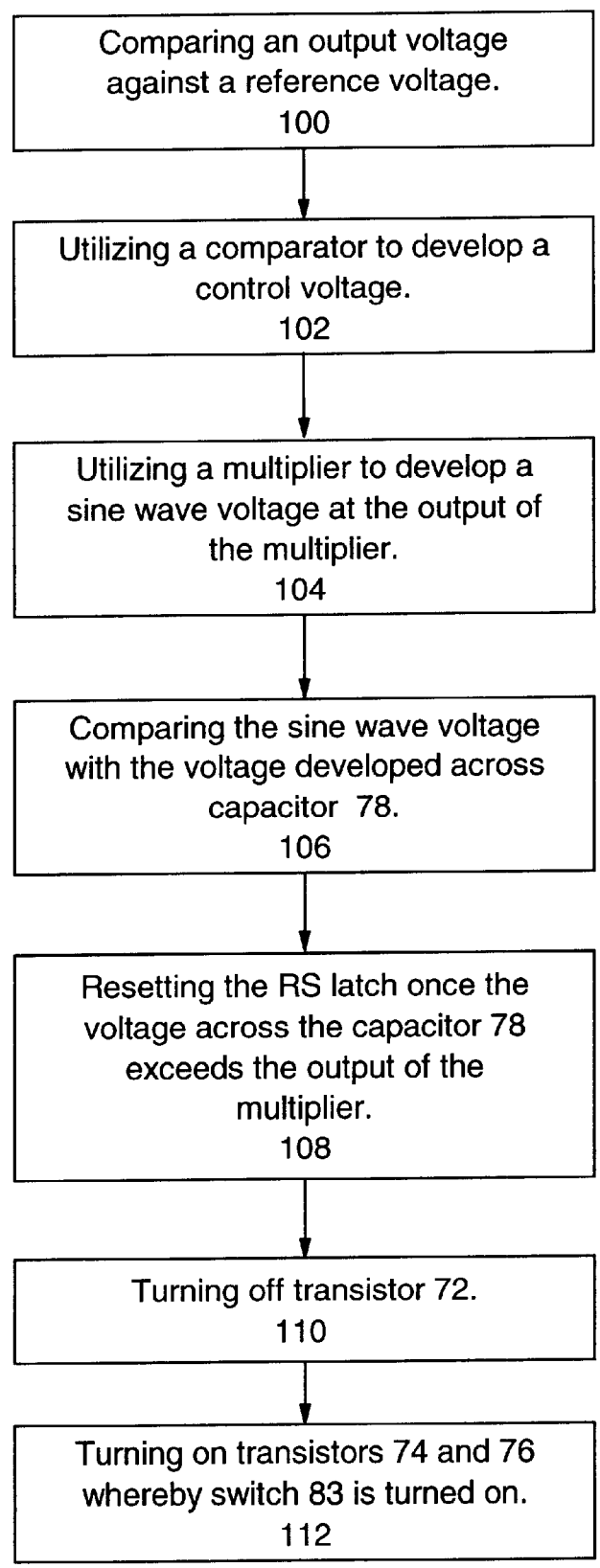

US 6,448,744 B1

POWER FACTOR CORRECTION CIRCUIT

FIELD OF THE INVENTION

The present invention relates generally to processing systems and specifically to a power factor correction circuit for a processing system.

BACKGROUND OF THE INVENTION

Power factor correction (PFC) circuits are commonly used in desktop computers where a high power factor is required. FIG. 1 depicts a conventional PFC circuit configuration 10. The PFC circuit configuration 10 includes a boost stage portion 11 coupled to an isolated DC/DC converter portion 12. The boost stage portion 11 includes an AC line voltage input 13 coupled to a rectifier bridge 14 wherein the rectifier bridge 14 is coupled to a first capacitor 16. The first capacitor 16 is coupled to an inductor 18 wherein the inductor 18 is coupled to two diodes 20, 22 and a transistor 24. The transistor 24 is coupled to a pulse width modulator 26 and the diode 20 is coupled to a bulk capacitor 28.

The isolated DC/DC converter portion 12 includes a pulse width modulator 30 coupled to a transistor 34 wherein the transistor 34 is coupled to a transformer 32. The transformer 32 is coupled to two diodes 36, 38. The two diodes 36, 38 are coupled to an inductor 42 wherein the inductor 42 is coupled to a capacitor 44 and an output 46. The output 46 is coupled to an error amplifier 40 wherein the error amplifier 40 is coupled to the pulse width modulator 30. The boost stage 11 develops a high voltage (i.e. 400V) across the bulk capacitor 28 and the isolated DC/DC converter portion 12 converts the high voltage to a lower voltage (for example, 5V) output.

However, because the conventional PFC circuit configuration 10 implements two stages (boost stage and DC/DC conversion stage) of power conversion, the overall efficiency is reduced. Because each stage of power conversion has a degree of inefficiency, the implementation of two stages of power conversion reduces the overall efficiency of the circuit. For example, if each stage of power conversion maintains an efficiency of 0.9, then the overall efficiency of the circuit is 0.81 (0.9×0.9).

Accordingly, what is needed is an improved PFC circuit that is more efficient than conventional PFC circuits. The circuit should be simple, cost effective and capable of being easily adapted to current technology. The present invention addresses such a need.

SUMMARY OF THE INVENTION

A single stage power factor correction circuit is disclosed. The circuit comprises a first comparator for receiving an output voltage and a reference voltage and for providing a control voltage, a multiplier coupled to the first comparator for receiving the control voltage and an input voltage and then providing a sine wave voltage and a control portion coupled to the multiplier for controlling the sine wave voltage and providing a regulated DC output.

Through the use of the circuit in accordance with the present invention, circuit efficiency is increased and the number of circuitry components is reduced. By reducing the number of circuitry components a significant reduction in manufacturing costs is achieved.

BRIEF DESCRIPTION OF THE DRAWINGS

FIG. 3 is a flow diagram of the operation of the of the PFC circuit in accordance with the present invention during normal operation.

DETAILED DESCRIPTION

The present invention relates to power factor correction circuit for a processing system. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

The present invention is disclosed in the context of a preferred embodiment. The preferred embodiment of the present invention provides for a single stage power factor correction circuit. In accordance with the present invention, the Boost stage of the conventional PFC is not needed because a single modified chopper stage is utilized to develop a regulated DC output. Accordingly, the single stage PFC circuit is more efficient than conventional two stage PFC circuit. Furthermore, since the PFC circuit in accordance with the present invention is a single stage circuit, it doesn't require as many components as conventional two stage PFC circuits and is therefore less expensive to manufacture than conventional PFC circuits.

Figure 1:
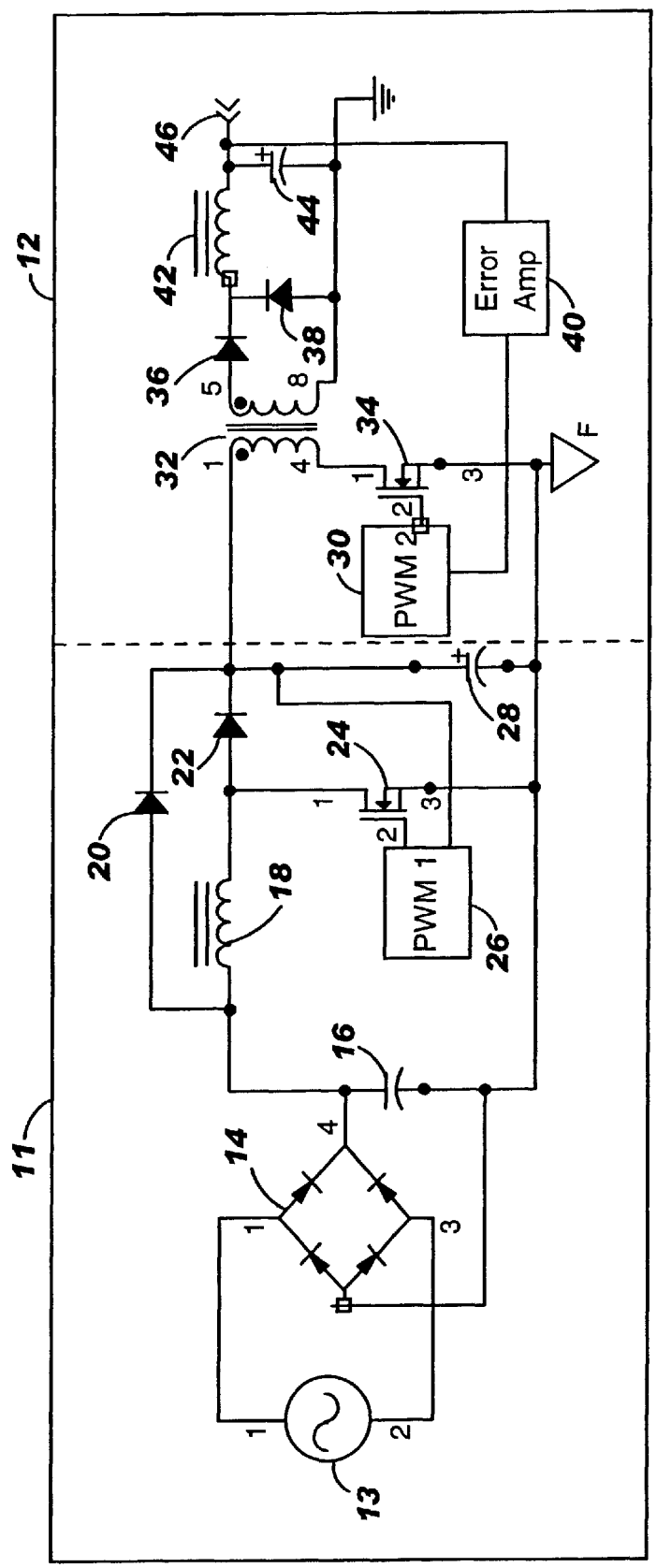
FIG. 1 is a conventional PFC circuit configuration.
Figure 2:
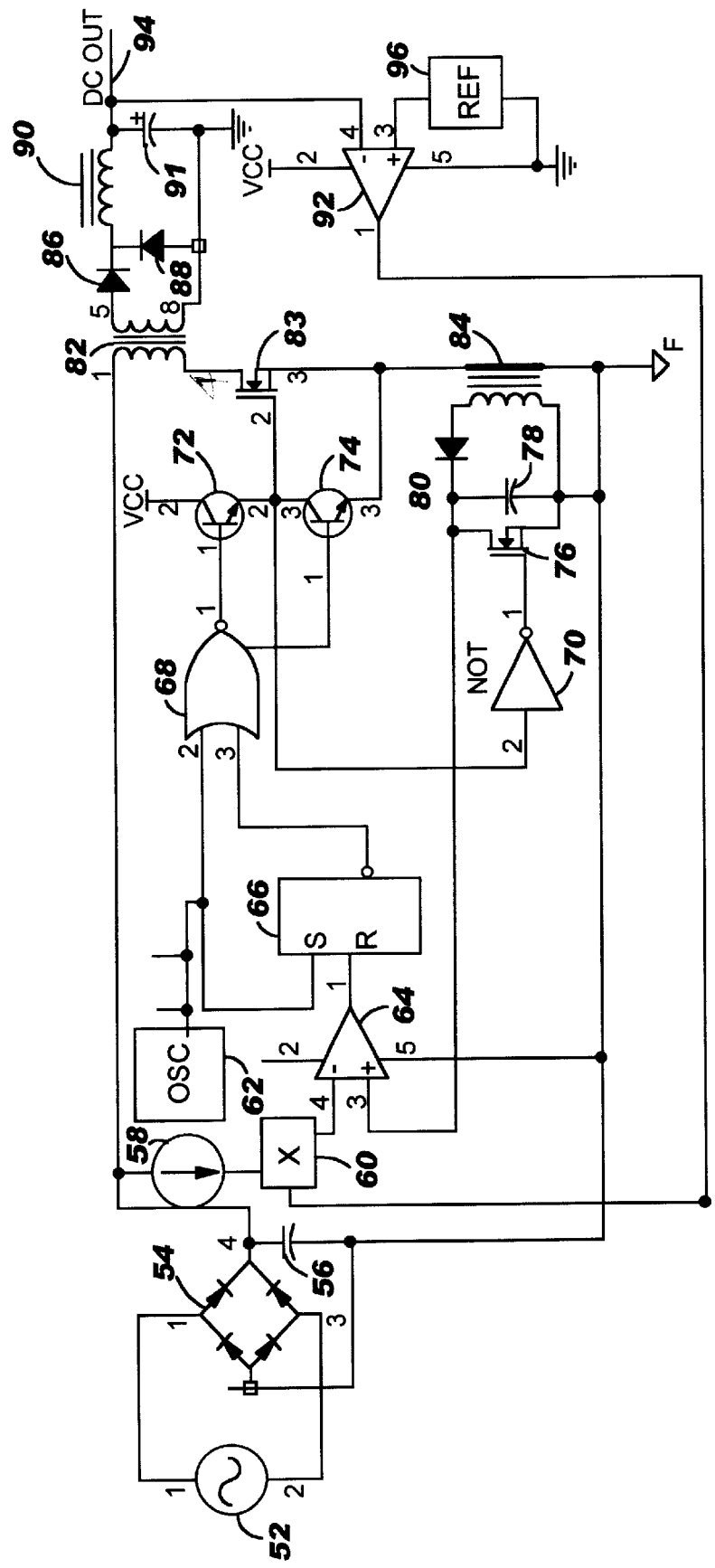
FIG. 2 shows the PFC circuit in accordance with the present invention.

For a description of a PFC circuit in accordance with the present invention, please refer now to FIG. 2. FIG. 2 shows a PFC circuit 50 in accordance with the present invention. The circuit 50 includes an input voltage 52 coupled to a rectifier bridge 54 wherein the rectifier bridge 54 is coupled to a first capacitor 56. The first capacitor 56 is coupled to a current source 58 and the current source 58 is coupled to a multiplier 60 wherein the multiplier 60 is coupled to a first comparator 92. The remaining portion of the circuit 50 comprises a control portion. The control portion comprises a second comparator 64 wherein the second comparator 64 is coupled to Reset-Set (RS) latch 66. The RS latch 66 is coupled to a NOR circuit 68 wherein the NOR circuit 68 is coupled to an oscillator 62 and two transistors 72, 74 wherein the transistors 72, 74 are coupled to a first switch 83.

The first switch 83 is coupled to a first transformer 82 and a second transformer 84 wherein the second transformer 84 is coupled to a capacitor 78 and a diode 80. The capacitor 78 is coupled to a second switch 76 wherein the second switch is coupled to a NOT circuit 70. The NOT circuit 70 is coupled to the first switch 83.

The first transformer 82 is coupled to two diodes 86, 88 wherein the two diodes 86, 88 are coupled to an inductor 90. The inductor 90 is coupled to a capacitor 91 and an output voltage 94 wherein the output voltage 94 is coupled to the first comparator 92. The first comparator 92 is coupled to the multiplier 60 and a reference voltage 96.

As previously stated, a single modified chopper stage is utilized to develop an isolated DC output. The output voltage 94 is regulated by sensing the output voltage 94 and utilizing the first comparator 92 to compare this voltage 94 with a reference voltage 96. The first comparator 92 provides a control voltage based on this comparison and the multiplier 60 multiplies the control voltage by a sample of the input voltage 52 via the current source 58. Because the input voltage 52 is a sine wave voltage, when multiplying the control voltage by a sample of the input voltage 52, the multiplier 60 generates a sine wave voltage at the output of the multiplier 60. The second comparator 64 is then utilized to compare the sine wave voltage against a voltage developed across the capacitor 78 wherein the capacitor 78 is in parallel with the second switch 76.

Once the voltage across the capacitor 78 exceeds the output of the multiplier 60, the RS latch 66 is reset. When the RS latch 66 is reset, transistor 72 is turned off and transistor 74 is turned on via the NOR circuit 68. This causes transistor 76 to turn on via the NOT circuit 70. The second transformer 84 is used to sense the current flowing through the first switch 83 and when the transistor 72 turns on, the capacitor 78 is allowed to discharge and switch 83 is turned on. Accordingly, when transistor 72 is turned off, the switch 83 is turned off. Also, the oscillator 62 behaves as a timer to control the rate at which the switch 83 is turned on and off.

For a further understanding of the operation of PFC circuit 50, please refer to FIG. 3. FIG. 3 is a flowchart of the operation of the PFC circuit in accordance with the present invention. Referring to FIGS. 2 and 3 together, first an output voltage 94 is compared against a reference voltage 96, via step 100. Next, a comparator 92 is utilized to develop a control voltage, via 102. A multiplier 60 is then utilized to develop a sine wave voltage at the output of the multiplier 60, via step 104. Preferably, this is accomplished by multiplying the control voltage by a sample of the input voltage.

The following steps describe how the sine wave voltage is controlled. A comparator 64 is utilized to compare the sine wave voltage with a voltage developed across capacitor 78, via 106. The RS latch 66 is then reset once the voltage across the capacitor 78 exceeds the output of the multiplier 60, via step 108. Next, transistor 72 is turned off, via step 110. Transistors 74 and 76 are then turned on whereby the first switch 83 is turned off, via step 112. When transistor 76 is turned on, capacitor 78 is accordingly discharged.

Through the use of the present invention, a single modified chopper stage is utilized to develop an isolated DC output for a PFC circuit. Accordingly, the single stage PFC circuit is more efficient than conventional two stage PFC circuit. Furthermore, since the PFC circuit in accordance with the present invention is a single stage circuit, it doesn't require as many components as conventional two stage PFC circuits and is therefore less expensive to manufacture than conventional PFC circuits.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A power factor correction circuit comprising:

a first comparator for receiving an output voltage and a reference voltage and for providing a control voltage;

a multiplier coupled to the first comparator for receiving the control voltage and an input voltage wherein the multiplier multiplies the control voltage by a sample of the input voltage to develop a sine wave voltage; and a control portion coupled to the multiplier for controlling the sine wave voltage and providing a regulated DC output wherein the control portion comprises:
a second comparator coupled to the multiplier;
a switch coupled to the second comparator; and
a capacitor coupled to the second comparator and the switch whereby the second comparator compares the sine wave voltage to a voltage developed across the capacitor.

2. The circuit of claim 1 wherein the multiplier multiplies the control voltage by a sample of the input voltage to develop the sine wave voltage.

3. The circuit of claim 2 wherein the control portion further includes a Reset-Set (RS) latch coupled to the second comparator.

4. The circuit of claim 3 wherein the RS latch is coupled to a NOR circuit.

5. The circuit of claim 4 wherein the NOR circuit is coupled to at least one transistor.

6. The circuit of claim 5 wherein the at least one transistor is further coupled to another switch wherein the another switch is coupled to a transformer.

7. A power factor correction circuit comprising:

a first comparator for receiving an output voltage and a reference voltage and for providing a control voltage;

a multiplier coupled to the first comparator for receiving the control voltage and an input voltage wherein the multiplier multiplies the control voltage by a sample of the input voltage to develop a sine wave voltage; and a control portion coupled to the multiplier for controlling the sine wave voltage and providing a regulated DC output wherein the control portion comprises:
a second comparator coupled to the multiplier;
a switch coupled to the second comparator;
a capacitor coupled to the second comparator and the switch whereby the second comparator compares the sine wave voltage to a voltage developed across the capacitor
an RS latch coupled to the second comparator;
a NOR circuit coupled to the RS latch wherein the NOR circuit is coupled to at least one transistor;
another switch coupled to the at least one transistor; and
a transformer coupled to the another switch.

* * * * *